Aug. 14, 1962   J. W. WALLACE ET AL   3,049,036
AUTOMATIC STRIP THICKNESS CONTROL APPARATUS
Filed April 8, 1957   7 Sheets-Sheet 4

United States Patent Office 3,049,036
Patented Aug. 14, 1962

1

3,049,036
AUTOMATIC STRIP THICKNESS CONTROL
APPARATUS
John W. Wallace, Orchard Park, and Robert E. Hull, Amherst, N.Y., and Raymond W. Moore, Whitehall, Pa., assignors to Westinghouse Electric Corporation, East Pittsburgh, Pa., a corporation of Pennsylvania
Filed Apr. 8, 1957, Ser. No. 651,512
15 Claims. (Cl. 80—32)

The present invention relates in general to automatic control apparatus for one or more motor devices, and more particularly to automatic control apparatus for controlling the operation of one or more motor devices of a rolling mill operative to determine the thickness or gauge of a continuous strip of metal or other material.

It is an object of the present invention to provide an improved motor device control apparatus, and more particularly to provide improved apparatus for controlling the operation of one or more motor devices of a strip rolling mill or the like to thereby better control the operation of said rolling mill, for example, regarding the strip thickness control over a greater length of said strip.

It is a different object of the present invention to provide an improved control apparatus for a strip rolling mill, which control apparatus is operative to provide a more rapid correction for changes in strip thickness and in addition is operative to more accurately maintain the desired strip thickness throughout the whole length of a rolled strip.

It is another object of the present invention to provide an improved control apparatus for a strip rolling mill that is operative to provide a maximum correction for any strip thickness errors less than a predetermined magnitude by varying the strip tension relative to a predetermined or particular stand of the rolling mill and then in addition to make an additional correction by varying the rolling gap between the roller members for larger errors of strip thickness greater than said predetermined magnitude.

It is a further object of the present invention to provide an improved control apparatus for a strip rolling mill, which apparatus is operative to more accurately and rapidly vary the spacing between the roller members of a particular stand as well as to vary more accurately and rapidly the operating speed of the same stand and/or some other stand to thereby control in an improved manner the final thickness or gauge of the strip as may be desired.

These and other objects and advantages of the present invention will become apparent in view of the following description taken in conjunction with the drawings wherein.

Figure 1:
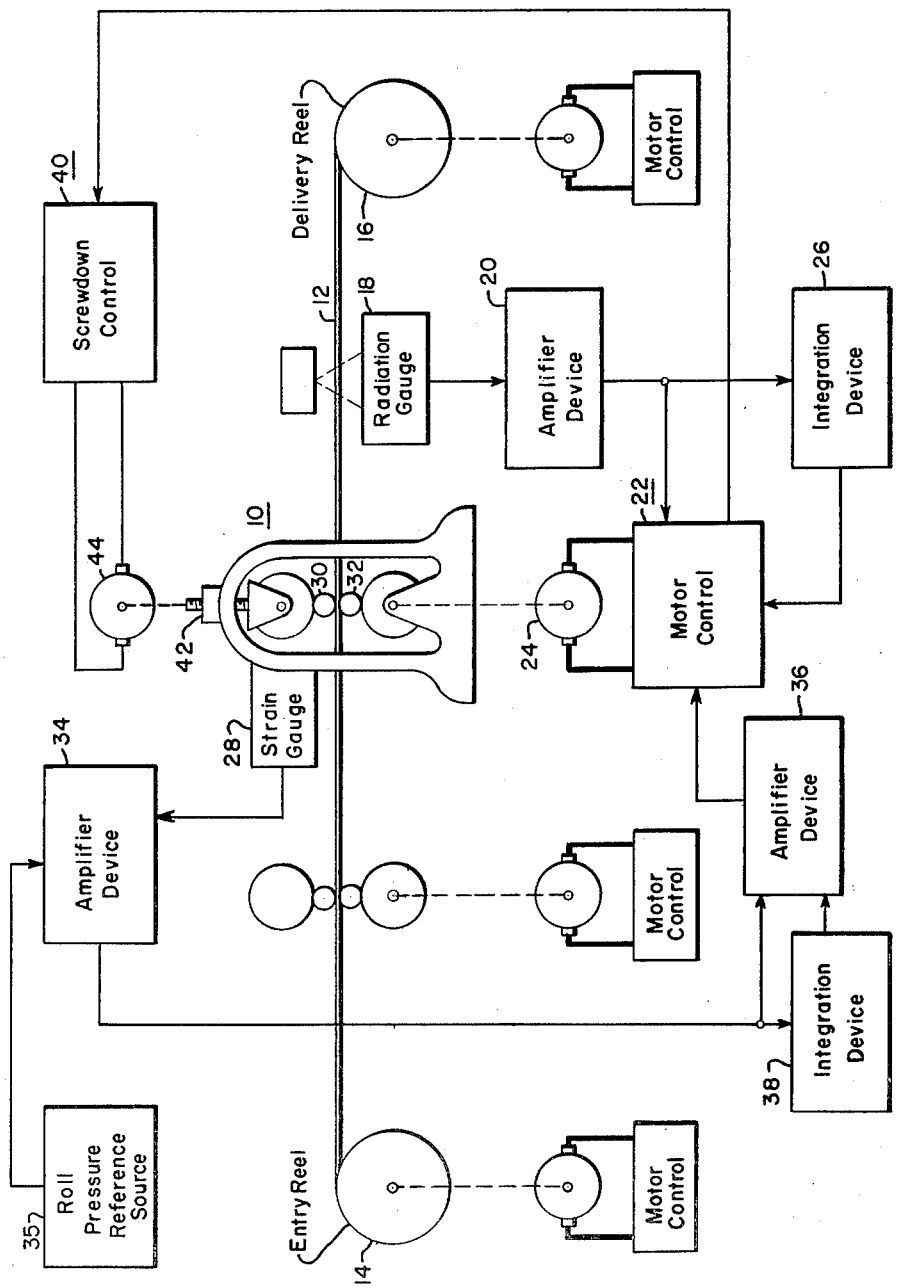
FIGURE 1 is a diagrammatic showing of one form of the control apparatus in accordance with the present invention.

In FIG. 1 there is shown a strip rolling mill including a stand 10, which may be the final stand of a plurality of stands. The rolling mill is operative to determine the thickness of a strip of material 12 passing from an entry reel 14 through the mill stand 10 to a delivery reel 16. A radiation gauge device 18 is operative to provide a control signal to an amplifier device 20 which control signal has a magnitude determined by the amount of error between the actual strip thickness and a predetermined desired or reference thickness for the strip 12, and has a polarity depending upon whether the actual strip thickness is greater or less than the predetermined desired or reference thickness for the strip 12.

The output of the amplifier device 20 is applied to a motor control device 22 for the mill stand motor 24 operative to control the operating speed of the mill stand 10. The output of the amplifier device 20 is also applied to the input of an integration device 26 which in turn supplies a control signal to the motor control device 22.

A magnetic strain gauge device 28 may be operatively mounted on the housing of the mill stand 10 to provide a control signal which has a magnitude depending upon the actual rolling pressure between an upper roller member 30 and a lower roller member 32 of the mill stand 10, or by providing a reference signal to the strain gauge device 28 the output of the strain gauge 28 may be made to correspond to any error between the actual rolling pressure and a predetermined desired or reference rolling pressure. Further the output signal from the strain gauge device 28 has a polarity depending upon whether the actual rolling pressure is greater or less than the predetermined reference or desired rolling pressure. The latter output control signal is applied through an amplifier device 34 to a second amplifier device 36 which in turn applies the control signal to the motor device 22 for the mill stand motor 24. The output of the amplifier device 34 is further applied through an integration device 38 to the amplifier device 36 as will be later explained.

The motor control device 22 is operative to provide an output signal to the screwdown control device 40 to thereby control the screwdown device 42 through the screwdown motor 44 when the sum of the signals received from the radiation gauge device 18 and the strain gauge device 28 is greater than a predetermined value as determined by the motor control device 22 to thereby operate the screwdown device 42 to vary the spacing between the upper roller member 30 and the lower roller member 32 for correcting errors in the thickness of the strip 12, as will be later explained.

Figure 2:
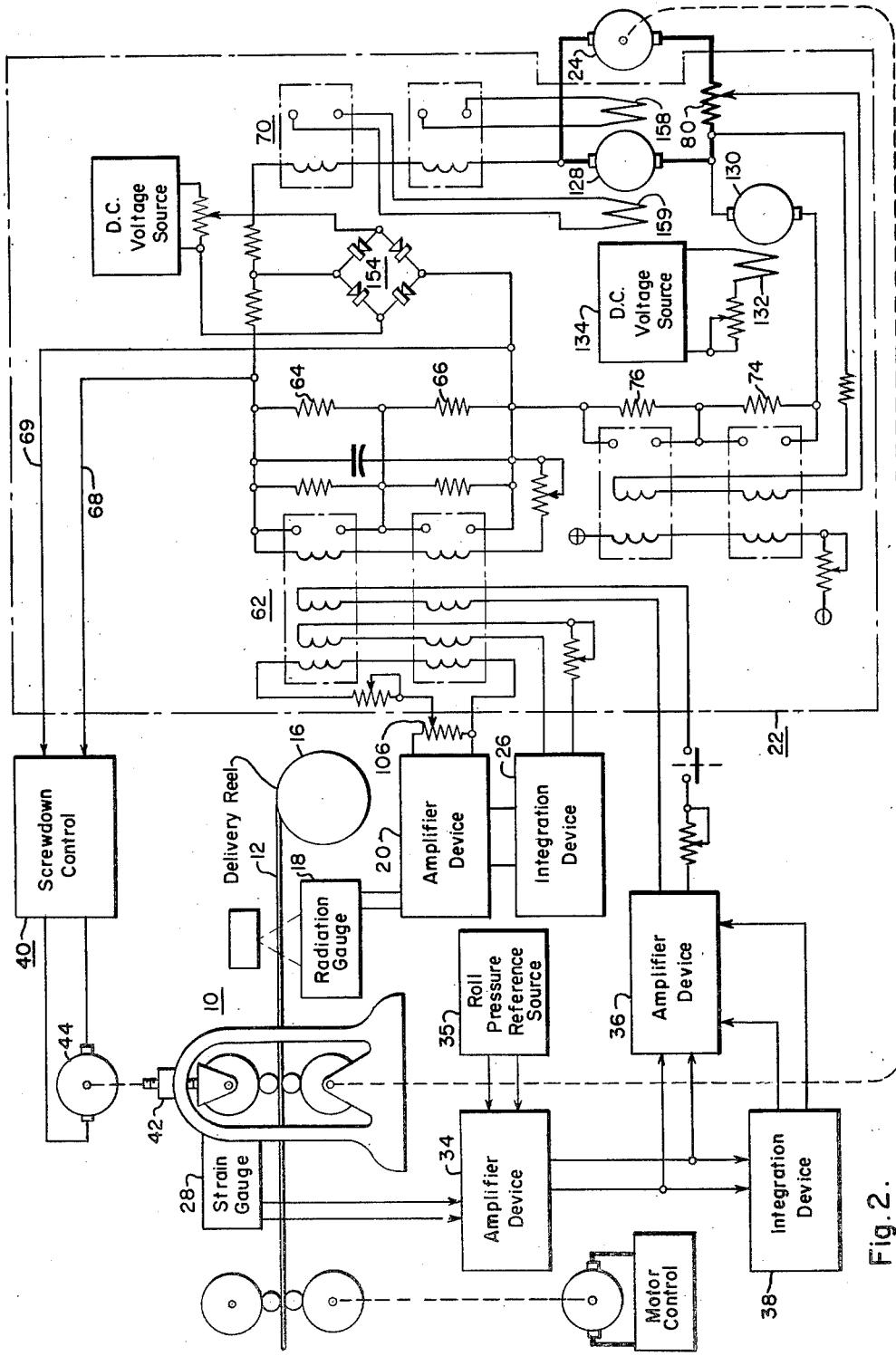
FIG. 2 is a schematic showing of one form of the control apparatus in accordance with the present invention.

In FIG. 2 there is shown a schematic view of the motor control device 22 shown in FIG. 1, with the control signal received from the radiation gauge 18 passing through the amplifier device 20 to provide a signal across a gain calibration potentiometer 106 which varies as a function of the thickness error or difference between the actual thickness of the strip 12 compared to a predetermined desired or reference thickness for the strip 12. The output signal from across the potentiometer 106 is applied to a first control winding of the magnetic amplifier device 62 for a particular stand of the rolling mill. The control signal received from the radiation gauge 18 is also applied to an integration device 26 which in turn energizes a second control winding of the magnetic amplifier device 62 in accordance with the teachings of copending application Serial No. 651,386, filed April 8, 1957, now Patent No. 2,972,269 issued February 21, 1961, by the same inventors and assigned to the same assignee as the present application.

The second control signal received from the strain gauge 28 is supplied to an amplifier device 34 which is operative with a zero error reference control signal source 35 to provide an output signal corresponding to the error or difference between the actual rolling pressure between the roller members of the stand 10 and a predetermined desired or reference rolling pressure. The latter control signal is supplied to an amplifier device 36, and is secondly supplied through an integration device 38 to the amplifier device 36 as explained in greater detail in another copending application Serial No. 651,387, filed April 8, 1957, now Patent No. 2,972,268, issued February 21, 1961, by the same inventors and assigned to the same assignee as the present application. The output control signal from the amplifier device 36 is supplied to a third control winding of the amplifier device 62.

Figure 7:
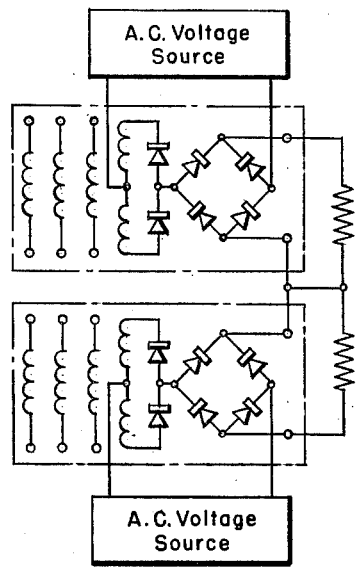
FIG. 7 shows a schematic of a well known push-pull circuit arrangement for magnetic amplifier devices.

The amplifier device 62 has its output or load windings connected, as shown in greater detail in FIG. 7, across a pair of impedance devices 64 and 66 which are operative in a series reference circuit with a second pair of impedance devices 74 and 76 that receive a well known IR compensating feedback control signal, and with the output voltage of a reference excitation generator 130 and the output voltage of an energy supply generator 128. The latter generator 128 is connected to supply control energy to the mill stand motor 24. The series reference circuit is operative to determine the excitation of a pair of control windings of the magnetic amplifier device 70 operative through its load windings, and as shown in greater detail in FIG. 7, to control the energization of field windings 158 and 159 for the energy supply generator 128.

The control signal representing the thickness error correction signal supplied across the impedance devices 64 and 66 is supplied through conductors 68 and 69 to control the operation of a screwdown control device 40 for operating the screwdown device 42 through the control motor 44 and to thereby vary the spacing between the roller members of the mill stand 10 as will be later described.

Figure 3:
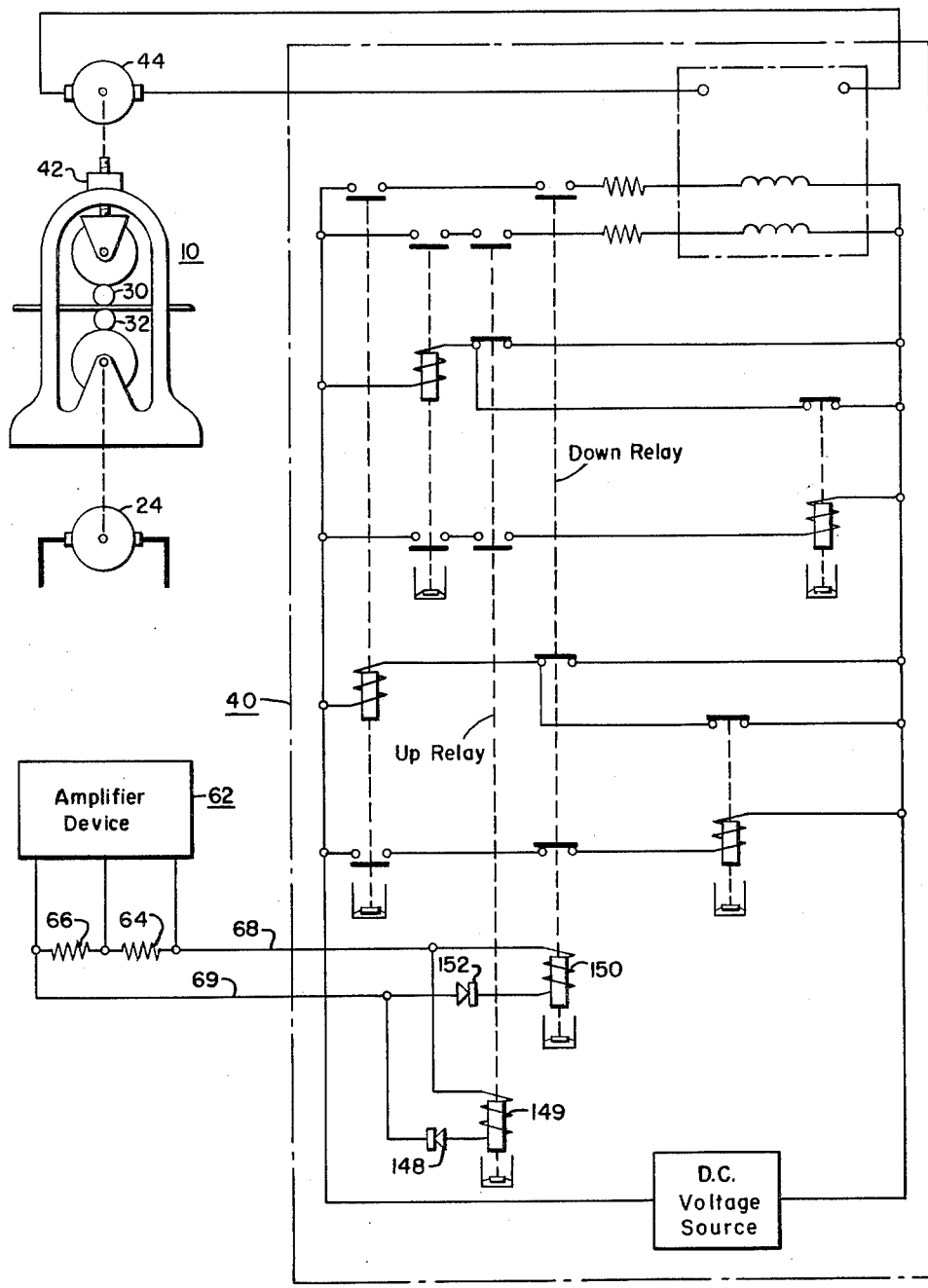
FIG. 3 is a schematic showing of the screwdown control apparatus in accordance with the present invention.

In FIG. 3 there is shown a schematic diagram for the screwdown control device 40 operative to control the rotational direction and the energization of a screwdown motor 44 to thereby operate a screwdown device 42 for varying the position of the upper roller member 30 and thusly the spacing between the roller members 30 and 32 of the mill stand 10. The thickness error correction signal provided in the output of amplifier device 62, and across the impedance members 64 and 66, is supplied through conductors 68 and 69 to energize through a first unidirectional conductor device 152 a screwdown closing relay control winding 150 and to energize through a second unidirectional device 148 a screwdown opening relay control winding 149. Thusly, when the thickness error signal applied across the impedance members 64 and 66 has a first polarity in agreement with the unidirectional device 152, the relay control winding 150 is energized for operating the screwdown device in a direction to decrease spacing between the roller members 30 and 32. When the thickness error correction signal has a second and opposite polarity in agreement with the unidirectional device 148, the relay control winding 149 is energized to operate the screwdown device 42 for increasing the spacing between the roller members 30 and 32. The screwdown control device 40 is additionally explained in the above copending application Serial No. 651,386, filed April 8, 1957.

Figure 4:
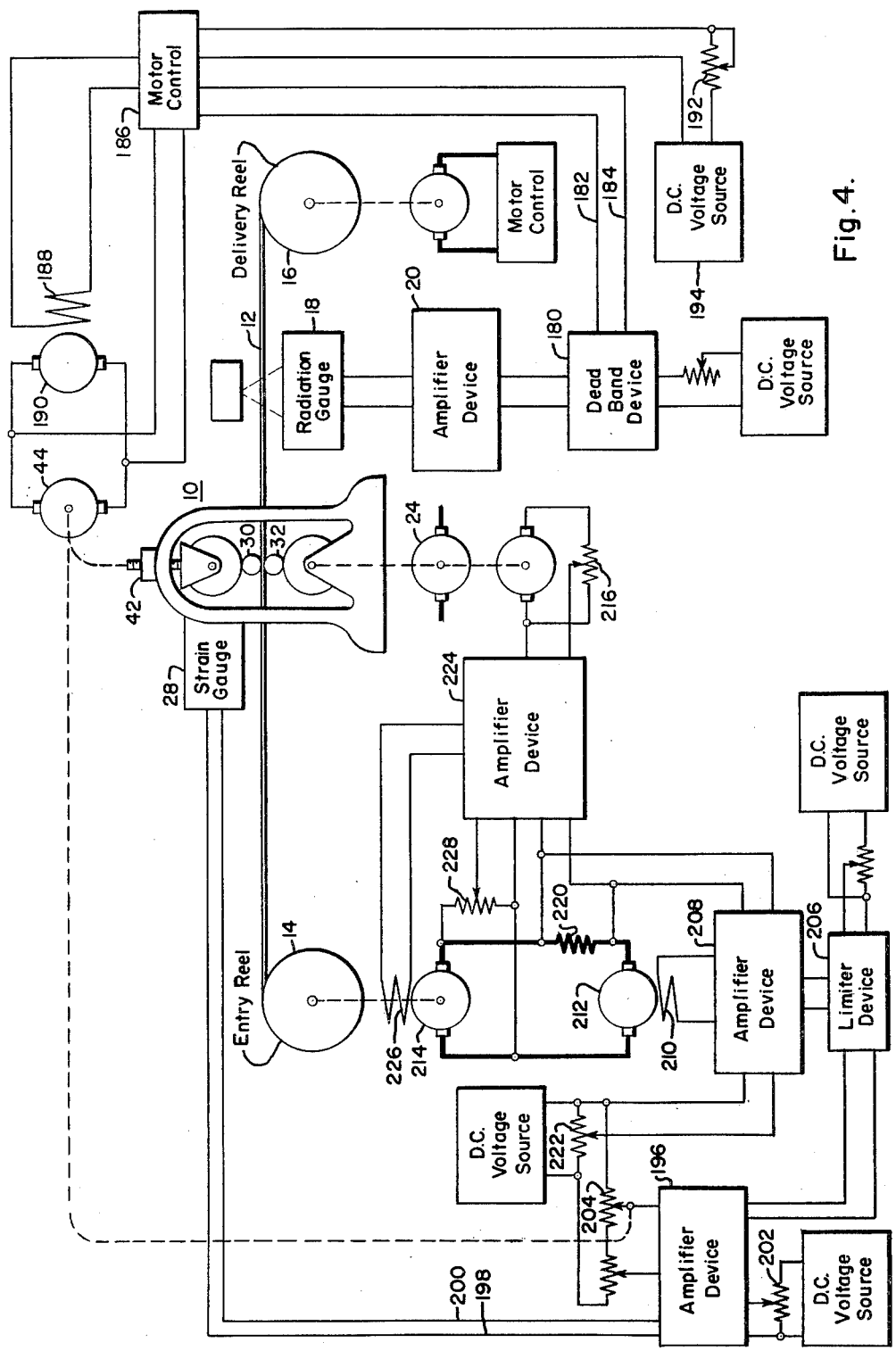
FIG. 4 is a diagrammatic showing of another modification of the present control apparatus.
Figure 8:
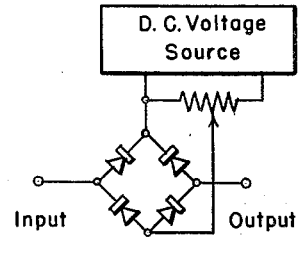
FIG. 8 shows a schematic of a well known deadband or deadzone device.

In FIG. 4 there is shown a modification of the control apparatus in accordance with the present invention, wherein the control signal received from the radiation gauge 18 is supplied through an amplifier device 20 to a deadband device 180, which per se is shown in FIG. 8 and is well known to persons skilled in the art and is operative to not provide an output control signal until the input control signal has a value greater than a predetermined deadband range of values, such that the output control signal from the radiation gauge device 18 must have a value greater than a value within said predetermined range of values as determined by the deadband device 180 before an output signal can be supplied through the conductors 182 and 184 to the voltage regulator device 186 for controlling the energization of the field winding 188 of the generator device 190 to thereby control the operation of the screwdown motor 44. A manual control device 192 is provided and operative with the D.C. voltage source 194 for controlling the operation of the screwdown motor 44 and the screwdown device 42 manually as may be desired.

Figure 9:
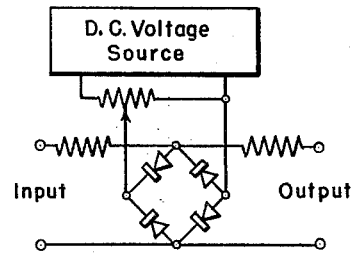
FIG. 9 shows a schematic of a well known limiter device.

The control signal received from the strain gauge device 28 is applied to a magnetic amplifier device 196 through the conductors 198 and 200. A predetermined rolling pressure reference signal is received from across the potentiometer device 202 as may be desired. A contact arm on a potentiometer device 204 is operatively connected to the screwdown device 42 and the screwdown motor 44 for providing a bridge zero adjustment control signal to the magnetic amplifier device 196. The output of the latter amplifier device 196 passes through a limiter device 206, as shown in FIG. 9, to an amplifier device 208 which controls the energization of a field winding 210 of a generator device 212 operatively connected to supply energy to the control motor 214 for the entry reel 14. In this regard the motor 214 may be operative with a previous mill stand relative to the illustrated mill stand 10 as may be desired.

A second input to the amplifier device 208 may be supplied from across an impedance device 220 connected in series with the control motor 214 and the energy supply generator 212 for providing an IR feedback control signal to compensate for armature losses of the motor as well known in this art. A current reference control signal may be supplied from across the potentiometer device 222 to the amplifier device 208.

Another amplifier device 224 is provided for controlling the energization of a control field 226 of the control motor 214, with the amplifier device 224 receiving one input control signal from the potentiometer device 216 as a function of the operative speed of the mill stand 10, and receiving a second control input signal from across the impedance member 220 as a function of the armature current of the control motor 214, and receiving a third input control signal from across the impedance device 228 as a function of the voltage excitation across the control motor 214.

Figure 5:
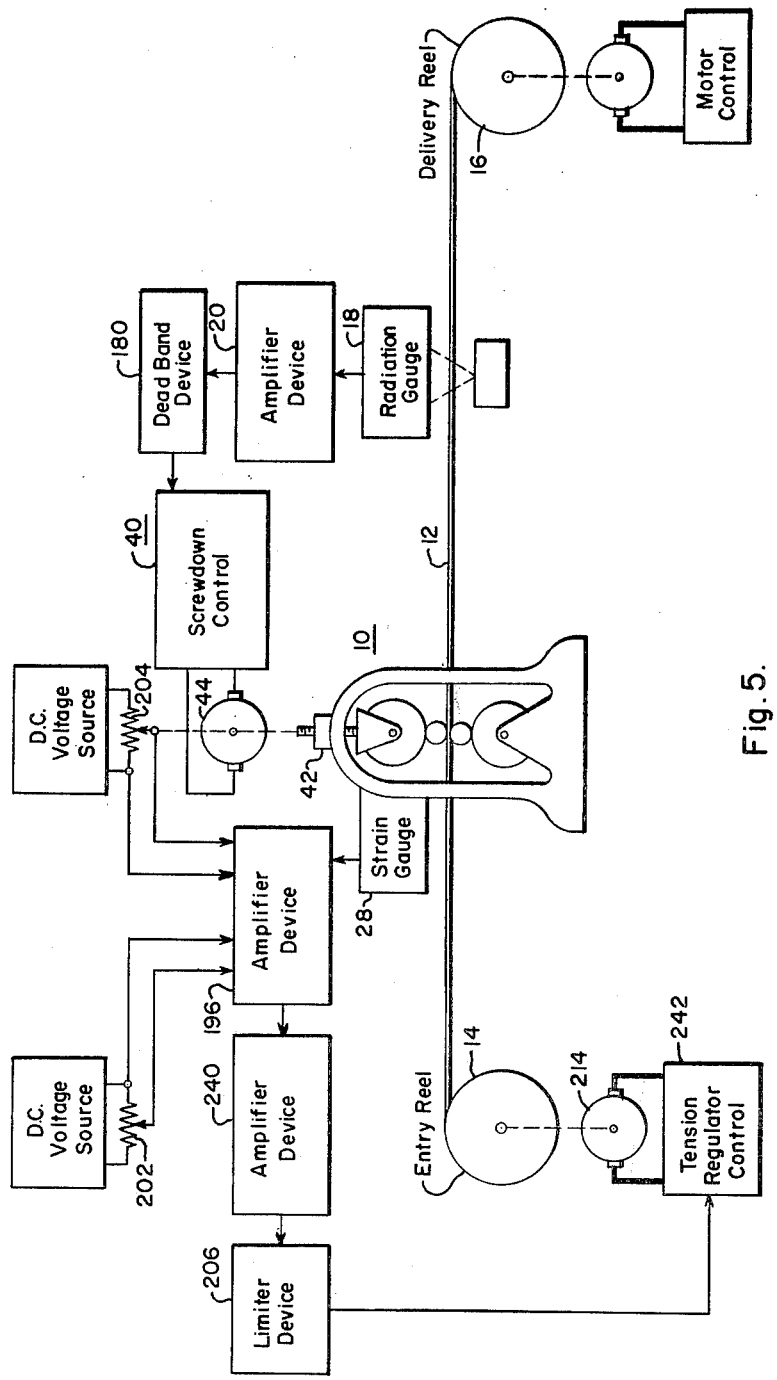
FIG. 5 is a diagrammatic showing of an additional modification of the present control apparatus.

In FIG. 5 there is shown a still further modification of the control apparatus in accordance with the present invention wherein a control signal is provided from a radiation gauge 18 to the amplifier device 20 and the deadband or deadzone device 180 to control the operation of the screwdown control device 40 operative with the screwdown motor 44 and the screwdown device 42 as previously explained. A different control signal is received from a strain gauge device 28 and operative with the amplifier device 196. A second control signal for the amplifier device 196 is received from the predetermined rolling pressure reference potentiometer device 202. A third control signal for the amplifier device 196 is received from the bridge zero adjustment potentiometer device 204.

The output of the amplifier device 196 is passed through a second amplifier device 240 to the limiter device 206 operative through a tension regulator control 242 which may be in accordance with the showing of FIG. 4 for controlling the operation of the control motor 214 for a previous stand of the mill or the entry reel 14 operative with the strip 12 passing through the mill stand 10 to the delivery reel 16.

Figure 6:
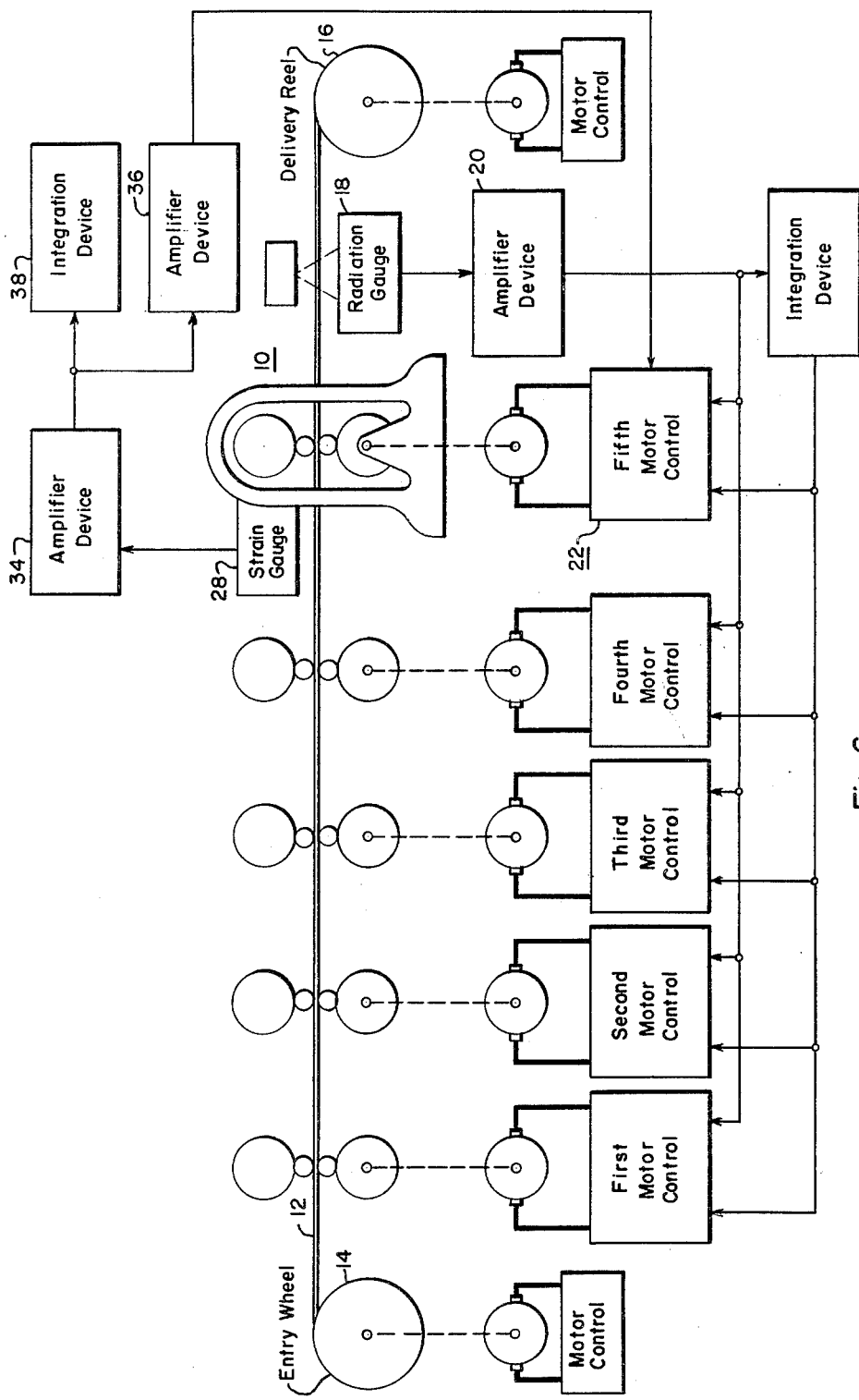
FIG. 6 shows a still further modification.

In FIG. 6 there is a diagrammatic showing of a still further modification of the control apparatus in accordance with the teachings of the present invention, wherein the control signal from the radiation gauge 18 passes through the amplifier device 20 and is supplied to the motor control devices for the respective first, second, third, fourth and fifth stands of the rolling mill operative with the strip 12 as it passes from the entry reel 14 to the delivery reel 16, and in accordance with the teachings of copending application Serial No. 651,386, filed April 8, 1957. The second control signal received from the strain gauge 28 passes through the amplifier device 34 and the integration device 38 and the amplifier device 36, as shown in FIG. 1, for supplying the control signal to the motor control device 22 for the fifth stand 10 of the rolling mill operative with the strip 12, and as previously described in copending application Serial No. 651,387, filed April 8, 1957.

In the operation of the control apparatus in accordance with the present invention, the radiation gauge device 18 will be operative as a differential gauge device which measures the difference between a standard or reference strip thickness and the actual strip thickness. A calibrated signal will then be applied to the motor control device 22 to modify the entry tension of the strip relative to the mill stand 10. The signal received from the radiation gauge device 18 would either be an additive or a subtractive signal for controlling the strip tension set by the mill operator. Thusly, it might be necessary for the operator to re-adjust the tension setting on the current regulator of the motor control device 22 as may be desired and as known to persons skilled in this art. Further, the motor control device 22 contains maximum control signal limit device 154 as shown in FIG. 2 which minimizes the recalibration of strip tension for correcting errors in strip thickness to thereby minimize the possibility of strip breakage or strip looping between the entry reel 14 and one or more of the mill stands.

The control apparatus as shown in FIGS. 1, 2 and 3 includes a combination of strip tension control and screw-down control, in which a signal from the radiation gauge device 18 responsive to the actual thickness of the strip 12 is combined with and added to a signal received from a strain gauge device 28 responsive to the actual rolling pressure of the mill stand 10 for providing a combined or total control signal for modifying the tension reference setting of the motor control device 22 for the mill stand 10 over a limited range to cause a change in the strip tension being rolled by the mill stand 10 and to thereby result in a change of strip thickness. In addition, the screw-down control device 40 contains an adjustable deadband control device responsive to said combined or total control signal so that the correction of errors in strip thickness for small thickness errors below a predetermined thickness error will be accomplished by modifying the tension of the strip through the motor control device 22, and the screw-down device 40 will be operative to take care of larger corrections in thickness error of the strip above said predetermined amount of thickness error.

In the operation of the control apparatus, an increase in strip thickness, as sensed by either an increase in rolling pressure as measured by the strain gauge device 28 or an increase in actual strip thickness as measured by the radiation gauge device 18, will provide respective output control signals to the motor device 22 having a magnitude and a polarity to cause the motor device 24 to change the operating speed of the rolling mill stand 10 to increase strip tension relative to the entry reel 14 to thereby reduce the actual thickness of the strip 12 as sensed by the radiation gauge device 18 and to decrease the strain in the mill stand 10 as sensed by the strain gauge device 28. For errors in strip thickness beyond a predetermined magnitude which can be safely corrected by varying the tension of the strip between the mill stand 10 and the entry reel 14, the screwdown device 42 is operative to vary the spacing between the roller members 30 and 32.

The control apparatus as shown in FIGS. 1 and 2 is operative such that the correction signal received from the strain gauge device 28 and applied to one control winding of the amplifier device 62, shown in FIG. 2, is additive relative to the control signal received from the radiation gauge 18 and applied through the amplifier device 20 to a second control winding of the amplifier device 62 and applied through the integration device 26 to a third control winding of the amplifier device 62, such that, for example, when the actual thickness of the strip 12 is greater than a predetermined desired or reference thickness, the rolling pressure of the mill stand 10 as sensed by the strain gauge device 28, will be above the predetermined desired or reference rolling pressure and the strain gauge device 28 will provide through its control circuit to the amplifier device 62 an error correction signal for increasing the operative speed of the motor 24 controlling the mill stand 10. If the amount of strip thickness error is to great the control signal from the strain gauge device 28 may be operative to operate the screwdown device 40 for decreasing the spacing between the roller members of the mill stand 10. Similarly, the control signal received from the radiation gauge 18 will be operative, for a strip thickness that is too great, to cause the mill stand motor 24 to similarly increase the tension in the strip between the mill stand 10 and the entry reel 14, and if the control signal received from the radiation gauge 18 has a sufficient amplitude, it will cause the screwdown control device 40 to decrease the spacing between the roller members of the mill stand 10. In this regard, the signals received from the strain gauge device 28 and the radiation gauge device 18 are additive, such that the sum of the signals may be sufficient to operate the screwdown control device 40 whereas the individual signals by themselves may not have an amplitude sufficient to energize the screwdown control device 40 for changing the spacing between the roller members of the mill stand 10.

The screwdown control device, shown in FIG. 3, is operative such that when the output voltage of the amplifier device 62 is applied across the impedance members 64 and 66 and has a value of approximately plus or minus 28 volts either the up or down relay winding 149 or 150, respectively, will be energized depending upon the polarity of the output control voltage from the amplifier device 62. In this regard it should be understood that the relay devices controlled by the windings 149 and 150 are respectively adjustable regarding the voltage at which the relay device picks up or operates, as well known to persons skilled in the art. This provides in effect the desired deadzone operation. Thusly, the relay devices do not become operative until the error correction signal across the impedance devices 64 and 66 become substantially 28 volts in magnitude and does not drop out until this voltage becomes approximately 14 volts. The "up" relay control winding 149, when energized, initiates an up jogging action of the control motor 44 and the screwdown device 42 to increase the spacing between the roller members 30 and 32 of the mill stand 10. The "down" control winding 150, when energized, initiates a downward jogging action of the screwdown device 42 to thereby decrease the spacing between the roller members 30 and 32. The screwdown device 42 is cyclically jogged in the proper direction by an on and off relay timing system, with the screwdown device 42 operating for approximately 0.5 second, then stopping for approximately 2 seconds for the effect to be measured by the strain gauge device 28 and the radiation gauge device 18. Then, if the error in strip thickness has not been corrected a sufficient amount, the screwdown device 42 is again jogged for a 0.5 second period and stopped for approximately 2 seconds. This sequence of operation continues until the voltage out of the amplifier device 62 becomes less than approxmtaely 14 volts, at which time the "up" control winding 149 or the "down" control winding 150 is no longer energized and drops out and the gauge control circuits including the strain gauge device 28 and the radiation gauge device 18 assume control of the strip thickness. The screwdown control device 40 may be provided for any one or more than one stand of the rolling mill or only for the last stand of the rolling mill as may be desired.

In the operation of the contol apparatus, as shown in FIG. 4, the radiation gauge device 18 is operative through the deadband device 180 to control the operation of the screwdown device 42 by controlling the energization of the variable voltage generator 190 through the voltage regulator device 186. The position of the screwdown device 42 is supplied to a potentiometer member 204 as a bridge zero adjustment setting. The output control signal from the strain gauge device 28 is supplied to control the operation of the control motor 214 for the entry reel 14 and thereby to vary the tension between the entry reel 14 and the mill stand 10, as may be required for correcting any errors in strip thickness as sensed by the strain gauge device 28. For example, if the actual strip thickness is greater than a predetermined desired or reference thickness, the rolling pressure will be increased above a predetermined reference rolling pressure, such that the strain gauge device 28 will provide a control signal having a polarity and magnitude to cause the control motor 214 for the entry reel 14 to increase the tension of the strip 12 between the entry reel 14 and the mill stand 10. Similarly, if the actual strip thickness is greater than the desired strip thickness, the radiation gauge 18 will provide a control signal having a polarity and a magnitude to cause the screwdown device 42 to decrease the spacing between the roller members 30 and 32 whenever the output control signal from the radiation gauge device 18 has a value greater than the preselected deadband range of the deadband device 180. In this respect, the limiter device 206 is operative to prevent the strain gauge device 28 from varying the strip tension between the entry reel 14 and the mill stand 10 to a tension value greater than a predetermined safe value for said strip tension. The voltage signal from across the potentiometer 216 is effective as a speed reference for the motor 214, and is opposed by the counter electromotive force voltage signal from across the potentiometer 228.

In the operation of the control apparatus as shown in FIG. 5, the radiation gauge device 18 is operative through a deadzone device 180 to control the spacing between the roller members of the mill stand 10 through the screw-down device 42. The strain gauge device 28 is operative through the limiter device 206 to vary the tension of the strip 12 betwen the entry reel 14 and the mill stand 10 by varying the operating speed of the entry reel 14.

In the operation of the control apparatus as shown in FIG. 6, the radiation gauge device 18 is operative to vary the operating speeds of the respective stands of the rolling mill in a predetermined manner as required to vary the final strip thickness as sensed by the radiation gauge device 18. The operation of the radiation gauge 18 in this regard is more fully explained in copending application Serial No. 651,386, filed April 8, 1957. The strain gauge device 28 is operative to vary the operating speed of the fifth stand only for varying the strip tension between the fourth and fifth stands for correcting errors of the strip thickness.

It should be understood that the strip thickness control apparatus as described in the present application is intended to be added to or combined with the presently well-known rolling mill control apparatus as well known to persons skilled in this art. Further, it should be understood that the teachings of the present application are readily adaptable to single or multiple stand mills, either tandem or reversible mills. For reversible mills it should be understood that radiation gauges will be provided at the delivery ends of the respective mills for each direction of strip movement.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. In control apparatus for a first device having a pair of roller members between which a strip of material may be positioned for performing a predetermined operation relative to said strip and a second device for pulling on the strip in a direction away from said first device, the combination of a motor member operatively connected to one of said first and second devices for controlling the tension of said strip between the first device and the second device, a strip thickness sensing device for providing a first control signal which varies as a predetermined function of the thickness of said strip, a roller pressure sensing device for providing a second control signal that varies as a predetermined function of the pressure between said pair of roller members, a signal integration device responsive to at least one of said first control signal and said second control signal for providing a third control signal which varies as a function of the integral of said one control signal, and a motor control device responsive to a predetermined combination of said first control signal, said second control signal and said third control signal and said second control signal and being operatively connected to said motor member for controlling the tension of said strip between said first device and said second device in accordance with the variations of said predetermined combination of said first control signal, said second control signal and said third control signal.

2. In control apparatus for a first device having a pair of cooperating and spaced roller members between which a strip of material may be positioned for performing a predetermined operation relative to said strip and a second device operative with said strip to control the tension in said strip between said first and second devices, the combination of a motor member operatively connected to one of said first and second devices for controlling the tension of said strip between the first and second devices, a strip thickness measurement device positioned at a predetermined location relative to one of said first and second devices for providing a first control signal which varies as a predetermined function of the actual thickness of said strip, a roller spacing sensing device operative with said first device for providing a second control signal that varies as a predetermined function of the actual spacing between said roller members, a signal function device responsive to one of said first and second control signals for providing a third control signal in accordance with a predetermined function of said one control signal, and a motor control device responsive to a combination of at least two of said first control signal said second control signal and said third control signal and operative with said motor member for controlling the tension of said strip between said first and second devices in accordance with the variations of each of at least said two of said first control signal, and said third control signal.

3. In control apparatus for a strip rolling mill including a first device having a pair of roller members between which a strip of material may be positioned for performing a predetermined operation relative to said strip and including a second device for pulling on the strip in a direction away from said first device, the combination of a motor member operatively connected to one of said first and second devices for controlling the tension of said strip between the first device and the second device, a strip thickness measurement device responsive to the actual thickness of said strip at a predetermined position relative to one of said first and second devices for providing a first control signal which varies as a function of the difference between said actual strip thickness and a predetermined reference strip thickness, a roller member spacing measurement device operative with said first device and responsive to the spacing between said roller members for providing a second control signal which varies as a function of the difference between the actual spacing between said roller members and a predetermined reference spacing between said roller members, a signal integration device responsive to one of said first and second control signals for providing a third control signal which varies as the integral of said one control signal, and a motor control device responsive to each of at least two of said first control signal said second control signal and said third control signal and operative with said motor member for controlling the tension of said strip between said first and second devices in accordance with the variations of a predetermined combination of at least said two of said first signal said second signal and said third control signal.

4. In control apparatus for a strip rolling mill including a first device having a pair of roller members between which a strip of material may be positioned for performing a predetermined operation relative to said strip and including a second device for controlling the tension of said strip between said first device and said second device, the combination of a motor member operatively connected to one of said first and second devices for controlling the tension of said strip between the first device and the second located device, a strip thickness measurement device for providing a first control signal which varies as a function of the actual thickness of said strip at a predetermined location relative to one of said first and second devices, a roller pressure sensing device for providing a second control signal which varies as a function of the actual roller pressure between said roller members, a first motor control device responsive to each of said first control signal and said second control signal and operatively connected to said motor member for controlling the tension of said strip between said first and second devices as a function of the variation of a combination of said first control signal and said second control signal, and a signal integration device responsive to said first control signal for providing a third control signal which varies as a function of the integral of said first control signal, with said first motor control device being responsive to said third control signal for controlling the tension of said strip between said first device and said second device as a function of the integral of said first control signal.

5. In control apparatus for a strip rolling mill including a first device having a pair of roller members between which a strip of material may be positioned for performing a predetermined operation relative to said strip and including a second device for pulling on the strip in a direction away from said first device, the combination of a motor member operatively connected to one of said first and second devices for controlling the tension of said strip between the first device and the second device, a strip thickness measurement device for providing a first control signal which varies as a function of the actual thickness of said strip at a predetermined location relative to one of said first and second devices, a roller pressure sensing device for providing a second control signal which varies as a function of the actual roller pressure between said roller members, a first motor control device responsive to said first control signal and operatively connected to said motor member for controlling the tension of said strip between said first and second devices as a function of the variation of said first control signal, with said first motor control device being responsive to said second control signal for controlling the tension of said strip between said first and second devices as a function of the variation of said second control signal, and a second motor control device responsive to said first control signal for providing a third control signal which varies as a predetermined function of the variation of said first control signal, with said first motor control device being responsive to said third control signal for changing the effect of said first control signal in a predetermined manner relative to the control of said strip tension, and a third motor control device responsive to said second control signal for providing a fourth control signal which varies as a predetermined function of said second control signal, with said first motor control device being responsive to said fourth control signal for changing the effect of said second control signal in a predetermined manner relative to the control of said strip tension.

6. In control apparatus for a strip rolling mill including a first device having a pair of roller members between which a strip of material may be positioned for determining the thickness of said strip and including a second device for pulling on the strip in a direction away from said first device, the combination of a motor member operatively connected to at least one of said first and second devices for controlling the tension of said strip between said first and second devices, a strip thickness sensing device for providing a first control signal which varies as a function of any error in the thickness of said strip after passing through said first device and relative to a predetermined strip thickness, a roller spacing sensing device for providing a second control signal which varies as a function of any error in the roller spacing between said roller members relative to a predetermined roller spacing, a first motor control device responsive to said first control signal and operative with said motor member for correcting any error in the thickness of said strip in accordance with the variations of said first control signal, with said first motor control device being responsive to said second control signal for controlling the above said strip tension for correcting any error in the spacing between said roller members in accordance with the variations of said second control signal, and a signal integration device responsive to said first control signal for providing a third control signal which varies as a function of the integral of said first control signal, with said first motor control device being responsive to said third control signal in an additive manner relative to said first control signal for correcting any error in the thickness of said strip in accordance with the variations of said third control signal.

7. In control apparatus for a strip rolling mill including a first device having a pair of roller members between which a strip of material may be positioned for performing a predetermined operation relative to said strip of material and including a second device for pulling on said strip of material in a direction away from said first device, the combination of a motor member operatively connected to one of said first and second devices for controlling the tension of said strip between said first device and the second device, a strip thickness measuring device for providing a first control signal which varies as a function of the actual thickness of said strip, a roller spacing measuring device for providing a second control signal which varies as a function of the actual spacing between said roller members, a first motor control device responsive to said first control signal and operative with said motor member for controlling the tension of said strip between said first device and said second device in accordance with the variations of said first control signal, with said first motor control device being responsive to said second control signal for controlling the tension of said strip between said first device and said second device in accordance with the variations of said second control signal, a second motor control device responsive to said first control signal for providing a third control signal which varies as a predetermined function of the variations of said first control signal, and a third motor control device responsive to said second control signal for providing a fourth control signal which varies as a predetermined function of the variations of said second control signal, with said first motor control device being responsive to said third control signal in an additive manner relative to said first control signal for controlling the tension of said strip between said first device and said second device in accordance with the variations of said third control signal, with said first motor control device being responsive to said fourth control signal in an additive manner relative to said second control signal for controlling the tension of said strip between said first device and said second device in accordance with the variations of said fourth control signal.

8. In control apparatus for a strip rolling mill including a first device having a pair of roller members between which a strip of material may be positioned for performing a predetermined operation relative to said strip and including a second device for pulling on the strip in a direction away from said first device, the combination of a motor member operatively connected to one of said first and second devices for controlling the tension of said strip between the first device and the second device, a strip thickness measuring device for providing a first control signal which varies as a function of the actual thickness of said strip at a predetermined location relative to one of said first device and said second device, a roller spacing sensing device for providing a second control signal which varies as a function of the actual spacing between said roller members, a motor control device responsive to said first control signal and operative with said motor member for controlling the tension of said strip between said first device and said second device in accordance with the variations of said first control signal, with said motor control device being responsive to said second control signal for controlling the tension of said strip between said first device and said second device in accordance with the variations of said second control signal, a first signal integration device responsive to said first control signal for providing a third control signal which varies as a function of the integral of said first control signal, and a second signal integration device responsive to said second control signal for providing a fourth control signal which varies as a function of the integral of said second control signal, with said motor control device being responsive to said third control signal for changing the effect of said first control signal in a predetermined manner relative to the variation of said strip tension, and with said motor control device being responsive to said fourth control signal for changing the effect of said second control signal in a predetermined manner relative to the variation of said strip tension.

9. In control apparatus for a strip rolling mill including a first device having a pair of roller members between which a strip of material may be positioned for performing a predetermined operation relative to said strip and including a second device for pulling on said strip in a direction away from said first device, the combination of a first motor member operatively connected to said first device for controlling the operating speed of said first device, a second motor member operatively connected to one of said roller members for varying the spacing between said roller members, a strip thickness sensing device for providing a first control signal as a function of the actual thickness of said strip at a predetermined location relative to one of said first and second devices, a roller pressure sensing device for providing a second control signal that varies as a function of the roller pressure between said pair of roller members, and a motor control device responsive to said first control signal and said second control signal and operatively connected to said first motor member for controlling the tension of said strip between said first and said second devices as a function of the variations of respectively said first control signal and said second control signal, and with said motor control device being operatively connected to said second motor member and responsive to said first control signal and said second control signal for controlling the spacing between said roller members as a function of the variations of respectively said first control signal and said second control signal.

10. In control apparatus for a strip rolling mill including a first device having a pair of roller members between which a strip of material may be positioned for performing a predetermined operation relative to said strip and including a second device for pulling on said strip in a direction away from said first device, the combination of a motor member operatively connected to one of said first and second devices for controlling the tension of said strip between the first device and the second device, a radiation gauge device operative with said strip for providing a first control signal that varies as a function of any error in said strip thickness relative to a predetermined reference thickness, a strain gauge device operative with said first device for providing a second control signal which varies as a function of any error in the rolling pressure between said roller members relative to a predetermined reference rolling pressure, and a motor control device operatively connected to said motor member and responsive to the sum of said first and second control signals for controlling the operation of said motor member to thereby vary the tension of said strip between said first and second devices to correct for any error in either of said strip thickness or said rolling pressure.

11. In control apparatus for a strip rolling mill including a first device having a pair of roller members between which a strip of material may be positioned for performing a predetermined operation relative to said strip and including a second device for pulling on said strip in a direction away from said first device, the combination of a motor member operatively connected to one of said first and second devices for controlling the tension of said strip betwen the first device and the second device, a radiation gauge device operative with said strip for providing a first control signal that varies as a function of any error in said strip thickness relative to a predetermined reference thickness, a strain gauge device operative with said strip for providing a second control signal which varies as a function of any error in the rolling pressure between said roller members relative to a predetermined reference rolling pressure, and a motor control device operatively connected to said motor member and responsive to the sum of said first and second control signals for controlling the operation of said motor member to thereby vary the tension of said strip between said first and second devices to correct for any error in either of said strip thickness or said rolling pressure, with said motor control device including a voltage limiting device responsive to said sum of the first and second control signals for providing a maximum value to said sum for thereby limiting the maximum tension of said strip between said first and second devices.

12. In control apparatus for a first device having a pair of roller members operative with a strip of material for determining the thickness of said strip and a second device for pulling on said strip in a direction away from said first device, the combination of a first motor member operatively connected to said first device for controlling the operating speed of said first device, a second motor member operatively connected to at least one of said roller members for varying the spacing between said roller members, a strip thickness sensing device operative with said strip for providing a first control signal which varies as a function of the thickness of said strip, a roller pressure sensing device operative with at least one of said roller members for providing a second control signal which varies as a function of the rolling pressure between said roller members, a first motor control device operatively connected to said first motor member and responsive to one of said first and second control signals for controlling the tension of said strip between said first device and said second device in accordance with the variations of said first control signal, a second motor control device operatively connected to said second motor member and responsive to the other of said first and second control signals for varying the spacing between said roller members in accordance with the variations of said second control signal, a control signal voltage limiter device operative with one of said first and second motor control devices for limiting the maximum value of the control signal to which it is responsive to thereby limit the control operation of the motor member operative with said one motor control device to values of the latter control signal below a predetermined value, and a voltage deadzone device operative with the other of said first and second motor control devices for preventing the control operation of the motor member operative with said other of said motor devices for values of the control signal to which it is responsive below a predetermined value.

13. In control apparatus for a rolling mill including a first device having a pair of roller members for determining the thickness of a strip of material and including a second device for pulling on said strip in a direction away from said first device, the combination of a first motor member operatively connected to said first device for controlling the operating speed of said first device and thereby controlling the tension of said strip relative to said first device, a second member operatively connected to at least one of said roller members for varying the spacing between said roller members, a radiation gauge device operative with said strip for providing a first control signal which varies as a function of any error in said strip thickness relative to a predetermined reference thickness, a strain gauge device operative with at least one of said roller members for providing a second control signal which varies as a function of any error in the rolling pressure between said roller members relative to a predetermined reference rolling pressure, a first motor control device operatively connected to said second motor member for controlling the operation of said second motor member, with said first motor control device being responsive to said first control signal for controlling the spacing between said roller members in accordance with the variations in said second control signal, and a second motor control device operatively connected to said first motor member for controlling the operation of said first motor member, with said second motor control device being responsive to said second control signal for controlling the operating speed of said first device in accordance with the variations in said second control signal.

14. In control apparatus for a rolling mill including a first device having a pair of roller members for determining the thickness of a strip of material and including a second device for pulling on said strip in a direction away from said first device, the combination of a first motor member operatively connected to said first device for controlling the operating speed of said first device and thereby controlling the tension of said strip relative to said first device, a second motor member operatively connected to at least one of said roller members for varying the spacing between said roller members, a radiation gauge device operative with said strip for providing a first control signal which varies as a function of any error in said strip thickness relative to a predetermined reference thickness, a strain gauge device operative with at least one of said roller members for providing a second control signal which varies as a function of any error in said rolling pressure between said roller members relative to a predetermined reference rolling pressure, a first motor control device operatively connected to said second motor member for controlling the operation of said second motor member, with said first motor control device being responsive to said first control signal for controlling the spacing between said roller members in accordance with the variations in said first control signal, and a second motor control device operatively connected to said first motor member for controlling the operation of said first motor member, with said second motor control device being responsive to said second control signal for controlling the operating speed of said first device in accordance with the variations in said second control signal, and a control signal limiter device operative with said second motor control device for limiting the maximum value of said second control signal to thereby limit the control operation of said first motor member to values of said second control signal below a predetermined value, and a control signal voltage deadzone device operative with said first motor control device for preventing the control operation of said second motor member of values of said first control signal below a predetermined value.

15. In control apparatus for a rolling mill including a first device having a pair of roller members for determining the thickness of a strip of material and including a second device for pulling on said strip in a direction away from said first device, the combination of a first motor member operatively connected to said first device for controlling the operating speed of said first device and thereby controlling the tension of said strip relative to said first device, a second motor member operatively connected to at least one of said roller members for varying the spacing between said roller members, a radiation gauge device operative with said strip for providing a first control signal which varies as a function of any error in said strip thickness relative to a predetermined reference thickness, a strain gauge device operative with at least one of said roller members for providing a second control signal which varies as a function of any error in said rolling pressure between said roller members relative to a predetermined reference rolling pressure, a first motor control device operatively connected to said second motor member for controlling the operation of said second motor member, with said first motor control device being responsive to one of said first and second control signals for controlling the spacing between said roller members in accordance with the variations in said one control signal, and a second motor control device operatively connected to said first motor member for controlling the operation of said first motor member, with said second motor control device being responsive to the other of said first and second control signals for controlling the operating speed of said first device in accordance with the variations in said other control signal, and a control signal limiter device operative with said second motor control device for limiting the maximum value of said other control signal to thereby limit the control operation of said first motor member to values of said other control signal below a predetermined value, and a control signal voltage deadzone device operative with said first motor control device for preventing the control operation of said second motor member for values of said one control signal below a predetermined value.

References Cited in the file of this patent

UNITED STATES PATENTS

| | | |
|---|---|---|
| 2,264,096 | Mohler | Nov. 25, 1941 |
| 2,300,990 | Stoltz | Nov. 3, 1942 |
| 2,653,247 | Lundahl | Sept. 22, 1953 |
| 2,659,154 | Rendel | Nov. 27, 1953 |
| 2,726,541 | Sims | Dec. 13, 1955 |